United States Patent
Abedini et al.

(10) Patent No.: US 11,690,035 B2
(45) Date of Patent: Jun. 27, 2023

(54) SYNCHRONIZATION SIGNAL MONITORING USING MULTIPLE CONFIGURATIONS WITHIN A SYNCHRONIZATION SIGNAL PERIOD

(71) Applicant: QUALCOMM Incorporated, San Diego, CA (US)

(72) Inventors: Navid Abedini, Somerset, NJ (US); Juergen Cezanne, Ocean Township, NJ (US); Muhammad Nazmul Islam, Littleton, MA (US); Jianghong Luo, Skillman, NJ (US); Luca Blessent, Whitehouse Station, NJ (US); Karl Georg Hampel, Hoboken, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 16/742,205

(22) Filed: Jan. 14, 2020

(65) Prior Publication Data

US 2020/0229117 A1 Jul. 16, 2020

Related U.S. Application Data

(60) Provisional application No. 62/792,717, filed on Jan. 15, 2019.

(51) Int. Cl.
*H04W 56/00* (2009.01)
*H04W 72/23* (2023.01)

(52) U.S. Cl.
CPC ....... *H04W 56/0015* (2013.01); *H04W 72/23* (2023.01)

(58) Field of Classification Search
CPC .......... H04W 56/0015; H04W 72/042; H04W 72/23; H04B 7/088; H04B 7/0695
See application file for complete search history.

(56) References Cited

U.S. PATENT DOCUMENTS

| 10,944,596 | B2* | 3/2021 | Chen | H04L 25/0204 |
| 2018/0109345 | A1* | 4/2018 | Svedman | H04J 11/0079 |
| 2018/0279240 | A1* | 9/2018 | Sheng | H04J 11/0069 |
| 2019/0190581 | A1* | 6/2019 | Zhang | H04B 7/0695 |

(Continued)

FOREIGN PATENT DOCUMENTS

WO 2018064271 A1 4/2018

OTHER PUBLICATIONS

International Search Report and Written Opinion—PCT/US2020/013606—ISA/EPO—dated May 4, 2020.

(Continued)

*Primary Examiner* — Will W Lin
(74) *Attorney, Agent, or Firm* — Danai Nelisile Mhembere; Harrity & Harrity, LLP

(57) ABSTRACT

Various aspects of the present disclosure generally relate to wireless communication. In some aspects, a wireless node may determine a default periodicity for repetition of a reference signal period, and may monitor for one or more reference signals in the reference signal period using a plurality of configurations for a plurality of intervals of the reference signal period. Each interval may be shorter than the default periodicity. Numerous other aspects are provided.

43 Claims, 13 Drawing Sheets

(56) References Cited

U.S. PATENT DOCUMENTS

| | | | | |
|---|---|---|---|---|
| 2019/0191397 | A1* | 6/2019 | Pan | H04W 56/00 |
| 2019/0230546 | A1* | 7/2019 | Takahashi | H04W 72/0446 |
| 2019/0319699 | A1* | 10/2019 | Lee | H04B 7/2656 |
| 2020/0028740 | A1* | 1/2020 | Kim | H04L 5/0053 |
| 2020/0053637 | A1* | 2/2020 | Tsai | H04L 5/001 |
| 2020/0100131 | A1* | 3/2020 | Yang | H04W 36/0011 |
| 2020/0120756 | A1* | 4/2020 | Wang | H04W 88/184 |
| 2020/0304940 | A1* | 9/2020 | Thangarasa | H04W 8/005 |
| 2021/0144782 | A1* | 5/2021 | Huang | H04W 76/11 |
| 2021/0168011 | A1* | 6/2021 | Davydov | H04L 1/0025 |
| 2021/0337497 | A1* | 10/2021 | Siomina | H04J 11/0079 |

OTHER PUBLICATIONS

Kuo Y-C., et al., "Latency-Optimal Beam Sweeping for Millimeter-Wave Communications," 2018, IEEE Globecom Workshops (GC Wkshps), IEEE, Dec. 9, 2018 (Dec. 9, 2018), pp. 1-7, XP033519199, DOI: 10.1109/GLOCOMW.2018.8644372, [retrieved on Feb. 19, 2019], Section I; figure 1, Section III.

Interdigital Communications: "Consideratons for Initial Synchronization in NR", 3GPP Draft, 3GPP TSG RAN WG1 Meeting #86bis, R1-1609920, Considerations Initial Synchronization in NR, 3rd Generation Partnership Project (3GPP), Mobile Competence Centre, 650, Route Des Lucioles, F-06921, Sophia-Antipolis Cedex, France, vol. RAN WG1. No. Lisbon. Portugal, Oct. 10, 2016-Oct. 14, 2016, Oct. 9, 2016 (Oct. 9, 2016), XP051149946, 10 pages, Retrieved from the Internet: URL: http://www.3gpp.org/ftp/Meetings_3GPP_SYNC/RAN1/Docs/ [retrieved on Oct. 9, 2016].

Mediatek Inc: "On Unified SS Block Composition," 3GPP Draft, 3GPP TSG RAN WG1 Meeting #88b, R1-1704453, SS_BLOCK_DESIGN_FINAL, 3rd Generation Partnership Project (3GPP), Mobile Competence Centre, 650, Route Des Lucioles, F-06921, Sophia-Antipolis Cedex, France, vol. RAN WG1. No. Spokane. Washington, USA, Apr. 3, 2017-Apr. 7, 2017, Apr. 2, 2017 (Apr. 2, 2017), XP051242598,4 pages, Retrieved from the Internet: URL: http://www.3gpp.org/ftp/Meetings_3GPP_SYNC/RAN1/Docs/ [retrieved on Apr. 2, 2017], Section 4.2; p. 3-p. 4; figures 5.6.

Partial International Search Report—PCT/US2020/013606—ISA/EPO—dated Mar. 27, 2020.

* cited by examiner

SYNCHRONIZATION SIGNAL MONITORING USING MULTIPLE CONFIGURATIONS WITHIN A SYNCHRONIZATION SIGNAL PERIOD

CROSS-REFERENCE TO RELATED APPLICATION

This Patent Application claims priority to U.S. Provisional Patent Application No. 62/792,717, filed on Jan. 15, 2019, entitled "SYNCHRONIZATION SIGNAL MONITORING USING MULTIPLE CONFIGURATIONS WITHIN A SYNCHRONIZATION SIGNAL PERIOD," and assigned to the assignee hereof. The disclosure of the prior Application is considered part of and is incorporated by reference in this Patent Application.

INTRODUCTION

Aspects of the present disclosure generally relate to wireless communications and to techniques and apparatuses for synchronization signal monitoring.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless node, may include determining a default periodicity for repetition of a reference signal period. The method may include monitoring for one or more reference signals in the reference signal period using a plurality of configurations for a plurality of intervals of the reference signal period, each interval being shorter than the default periodicity.

In some aspects, a wireless node may include memory and one or more processors coupled to the memory. The memory and the one or more processors may be configured to determine a default periodicity for repetition of a reference signal period. The memory and the one or more processors may be configured to monitor for one or more reference signals in the reference signal period using a plurality of configurations for a plurality of intervals of the reference signal period, each interval being shorter than the default periodicity.

In some aspects, a non-transitory computer-readable medium may store one or more instructions for wireless communication. The one or more instructions, when executed by one or more processors of a wireless node, may cause the one or more processors to determine a default periodicity for repetition of a reference signal period. The one or more instructions, when executed by one or more processors of a wireless node, may cause the one or more processors to monitor for one or more reference signals in the reference signal period using a plurality of configurations for a plurality of intervals of the reference signal period, each interval being shorter than the default periodicity.

In some aspects, an apparatus for wireless communication may include means for determining a default periodicity for repetition of a reference signal period. The apparatus may include means for monitoring for one or more reference signals in the reference signal period using a plurality of configurations for a plurality of intervals of the reference signal period, each interval being shorter than the default periodicity.

In some aspects, a method of wireless communication, performed by a first wireless node, may include transmitting, to a second wireless node, an indication of a plurality of configurations to be used by the second wireless node to monitor for one or more reference signals in a plurality of intervals of a reference signal period, each interval being shorter than a default periodicity for repetition of the reference signal period. The method may include transmitting the one or more reference signals.

In some aspects, a first wireless node may include memory and one or more processors coupled to the memory. The memory and the one or more processors may be configured to transmit, to a second wireless node, an indication of a plurality of configurations to be used by the second wireless node to monitor for one or more reference signals in a plurality of intervals of a reference signal period, each interval being shorter than a default periodicity for repetition of the reference signal period. The memory and the one or more processors may be configured to transmit the one or more reference signals.

In some aspects, a non-transitory computer-readable medium may store one or more instructions for wireless communication. The one or more instructions, when executed by one or more processors of a first wireless node, may cause the one or more processors to transmit, to a second wireless node, an indication of a plurality of configurations to be used by the second wireless node to monitor for one or more reference signals in a plurality of intervals of a reference signal period, each interval being shorter than a default periodicity for repetition of the reference signal period. The one or more instructions, when executed by one or more processors of a first wireless node, may cause the one or more processors to transmit the one or more reference signals.

In some aspects, an apparatus for wireless communication may include means for transmitting, to a wireless node, an indication of a plurality of configurations to be used by the wireless node to monitor for one or more reference signals in a plurality of intervals of a reference signal period, each interval being shorter than a default periodicity for repetition of the reference signal period. The apparatus may include means for transmitting the one or more reference signals.

Aspects generally include a method, apparatus, system, computer program product, non-transitory computer-readable medium, user equipment, base station, wireless node, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
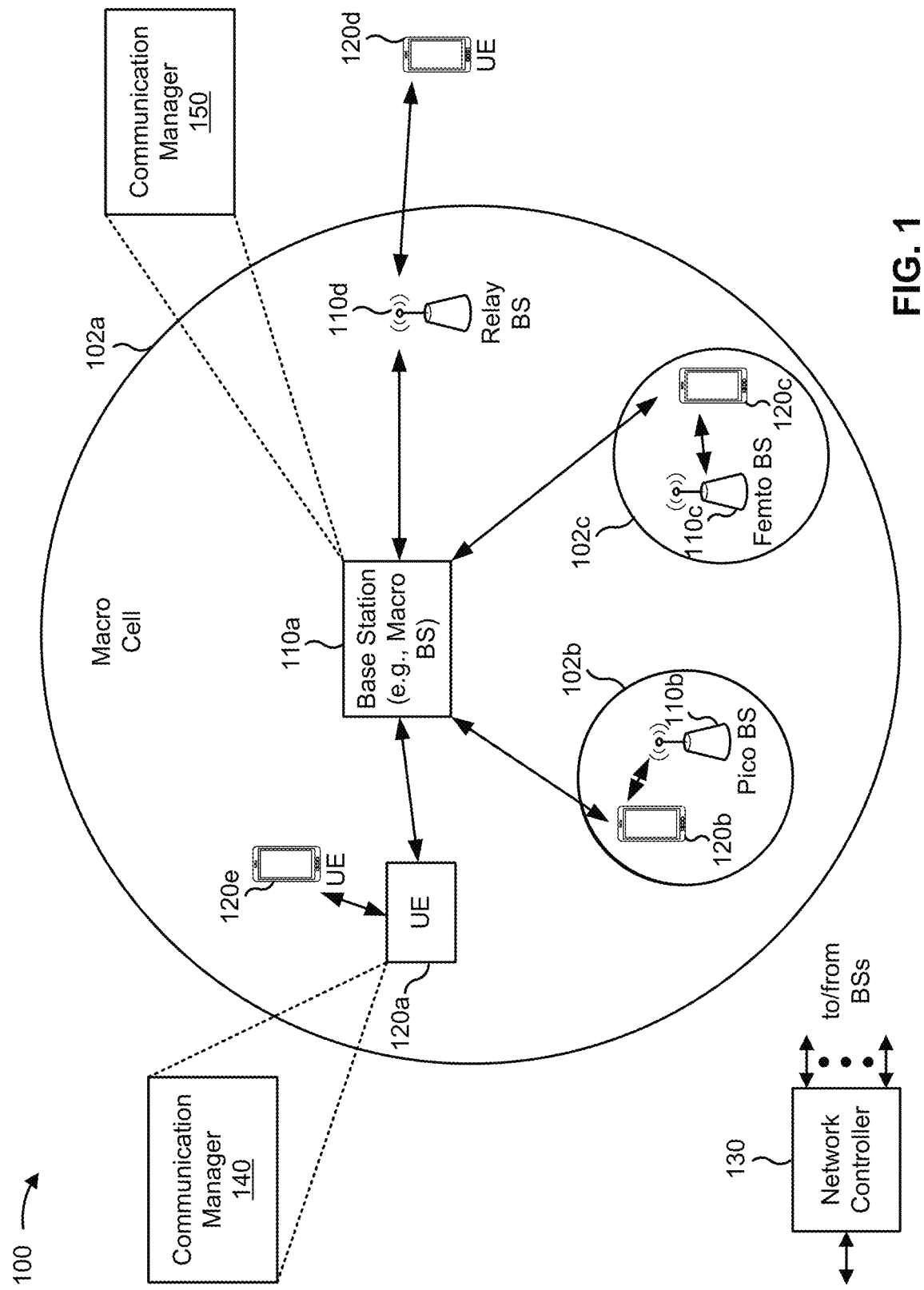
FIG. 1 is a block diagram conceptually illustrating an example of a wireless communication network, in accordance with various aspects of the present disclosure.

A synchronization signal (SS) burst set may include a plurality of SS bursts. Each SS burst may include one or more SS blocks (SSBs). In some aspects, different SSBs, within an SS burst set, may be beam-formed differently (e.g., using beam sweeping). Furthermore, corresponding SSBs in different SS burst sets (e.g., SSBs that have the same index in different SS burst sets) may be transmitted on the same beam. An SS burst set may be periodically transmitted by a base station according to a periodicity for repetition of the SS burst set, such as a default periodicity which may be specified by a wireless communication standard or configured by the base station.

In some cases, a base station (or another transmitter) may transmit synchronization signal (SS) burst sets with a periodicity that is shorter than a default (e.g., predetermined) periodicity. When a wireless node (e.g., a UE and/or the like) searches for SS blocks (SSBs) as part of an initial network access procedure, the wireless node may not be notified regarding whether the base station is using a shorter periodicity than the default periodicity. When the wireless node has a capability to use multiple configurations (e.g., multiple beams) to search for SSBs, switching between configurations after the default periodicity has expired (e.g., at the end of each default periodicity) can increase latency and can consume excess battery power when the base station transmits SS burst sets with a periodicity that is less than the default periodicity.

Some techniques and apparatuses described herein permit the wireless node to use multiple configurations to search for SSBs within multiple intervals of a single SS burst set. For example, the wireless node may switch between different configurations (e.g., receive beam configurations) to monitor for SSBs during different intervals of the default periodicity. This can reduce latency (e.g., of SSB acquisition, of acquisition of system information, of network access, and/or the like) and can conserve battery power of the wireless node (e.g., that would otherwise be used to search for SSBs for a longer amount of time). Additional details are provided below.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, base station 110 may include a single TRP or multiple TRPs. Additionally, or alternatively, base station 110 may include an integrated access and backhaul (IAB) donor in an IAB network, an IAB node, and/or the like. In some aspects, the UE 120 may be an IAB node.

As shown in FIG. 1, the UE 120 may include a communication manager 140. As described in more detail elsewhere herein, the communication manager 140 may determine a default periodicity for repetition of a reference signal period; may monitor for one or more reference signals in the reference signal period using a plurality of configurations for a plurality of intervals of the reference signal period; and/or the like. Additionally, or alternatively, the communication manager 140 may perform one or more other operations described herein.

As further shown in FIG. 1, the base station 110 (e.g., an IAB node and/or the like) may include a communication manager 150. As described in more detail elsewhere herein, the communication manager 150 may determine a default periodicity for repetition of a reference signal period; may monitor for one or more reference signals in the reference signal period using a plurality of configurations for a plurality of intervals of the reference signal period; and/or the like. Additionally, or alternatively, the communication manager 150 may perform one or more other operations described herein.

As indicated above, FIG. 1 is provided merely as an example. Other examples may differ from what is described with regard to FIG. 1.

Figure 2:
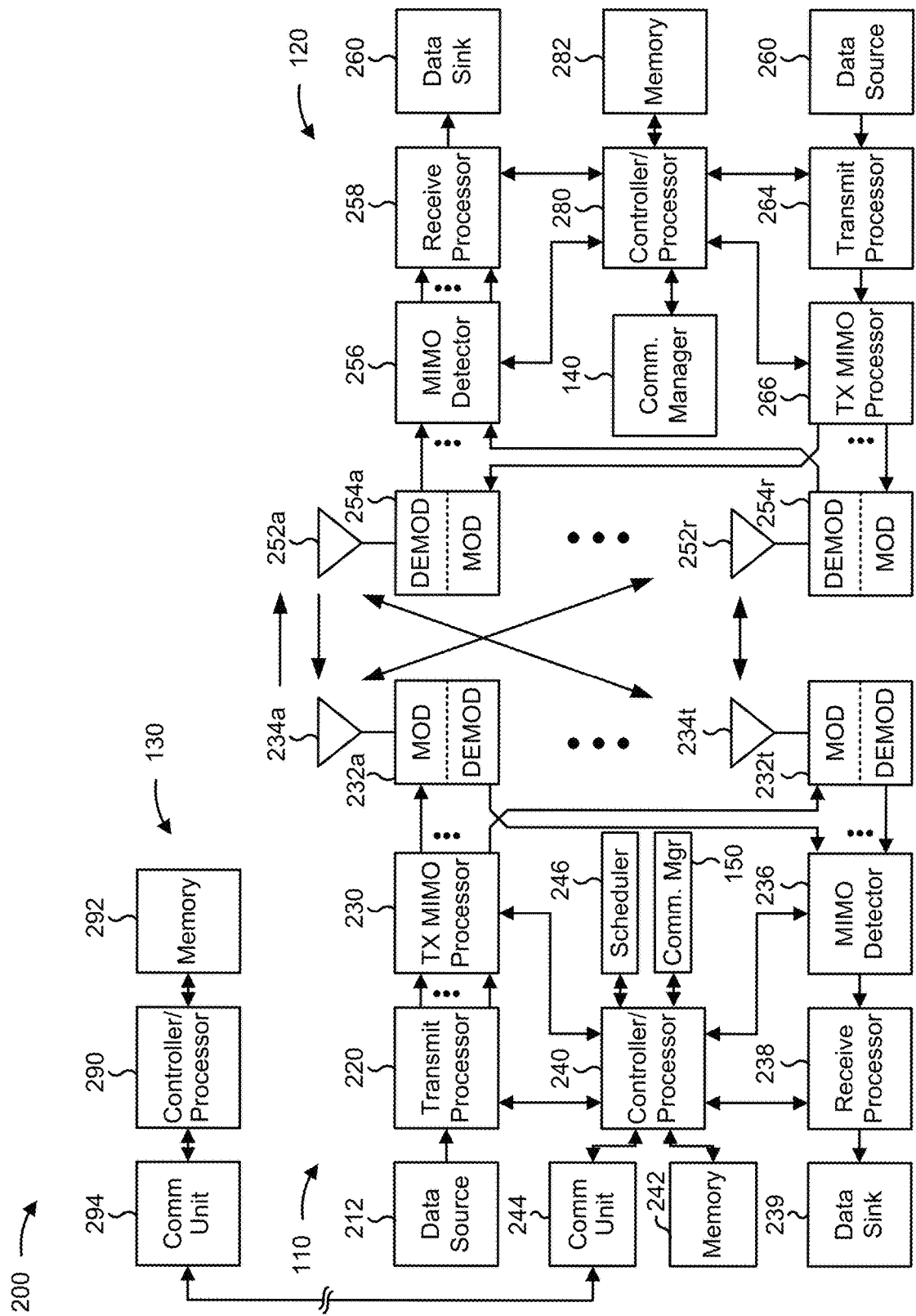
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization signal monitoring using multiple configurations within a synchronization signal period, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, a wireless node (e.g., the base station 110, the UE 120, and/or the like) may include means for determining a default periodicity for repetition of a reference signal period; means for monitoring for one or more reference signals in the reference signal period using a plurality of configurations for a plurality of intervals of the reference signal period; and/or the like. Additionally, or alternatively, the UE 120 may include means for performing one or more other operations described herein. Additionally, or alternatively, a first wireless node (e.g., the base station 110, the UE 120, and/or the like) may include means for transmitting, to a second wireless node, an indication of a plurality of configurations to be used by the second wireless node to monitor for one or more reference signals in a plurality of intervals of a reference signal period, each interval being shorter than a default periodicity for repetition of the reference signal period; means for transmitting the one or more reference signals; and/or the like. In some aspects, such means may include the communication manager 140, the communication manager 150, one or more components of the UE 120 described in connection with FIG. 2, one or more components of the base station 110 described in connection with FIG. 2, and/or the like.

As indicated above, FIG. 2 is provided merely as an example. Other examples may differ from what is described with regard to FIG. 2.

Figure 3:
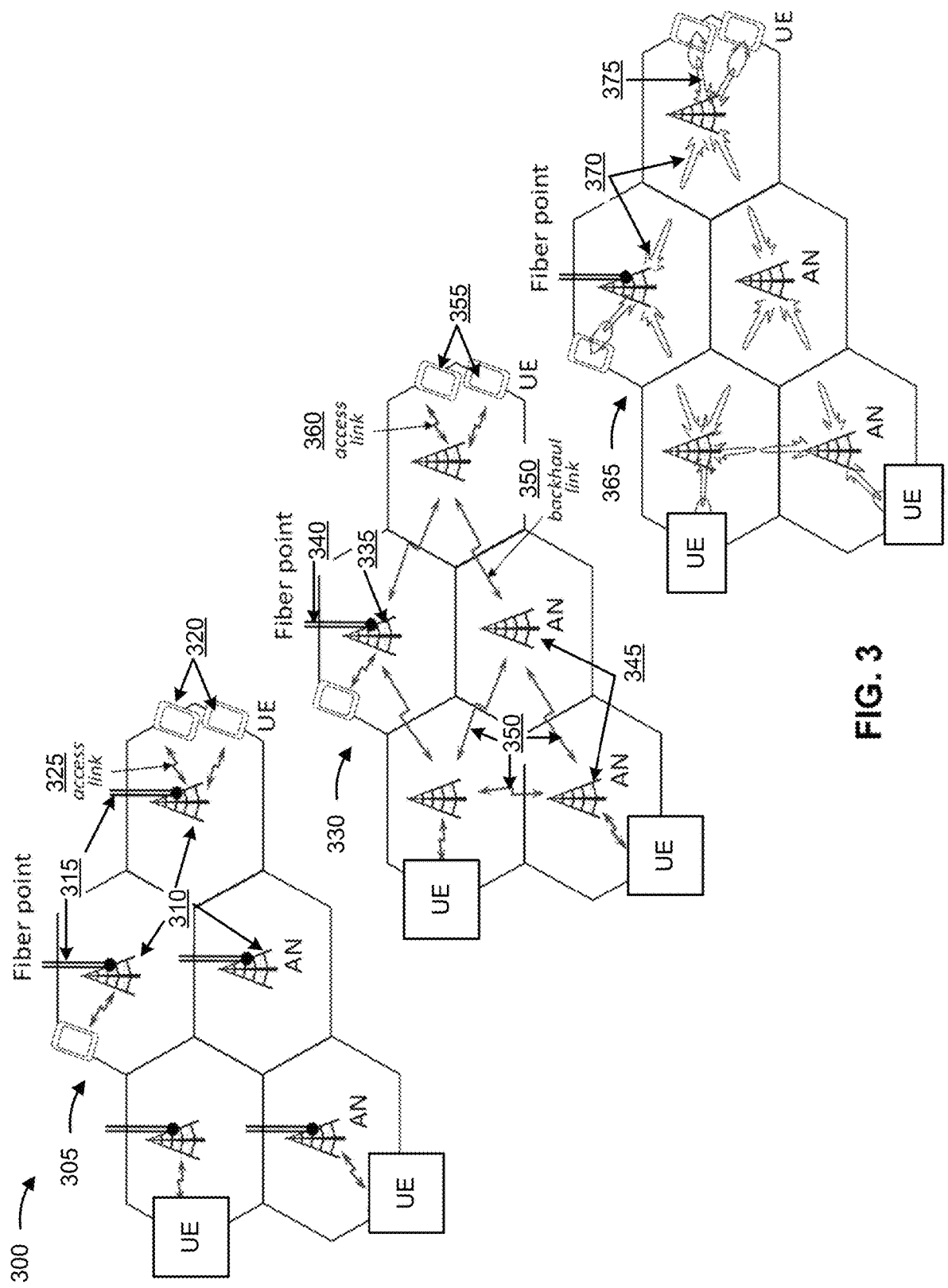
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding, and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are possible. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
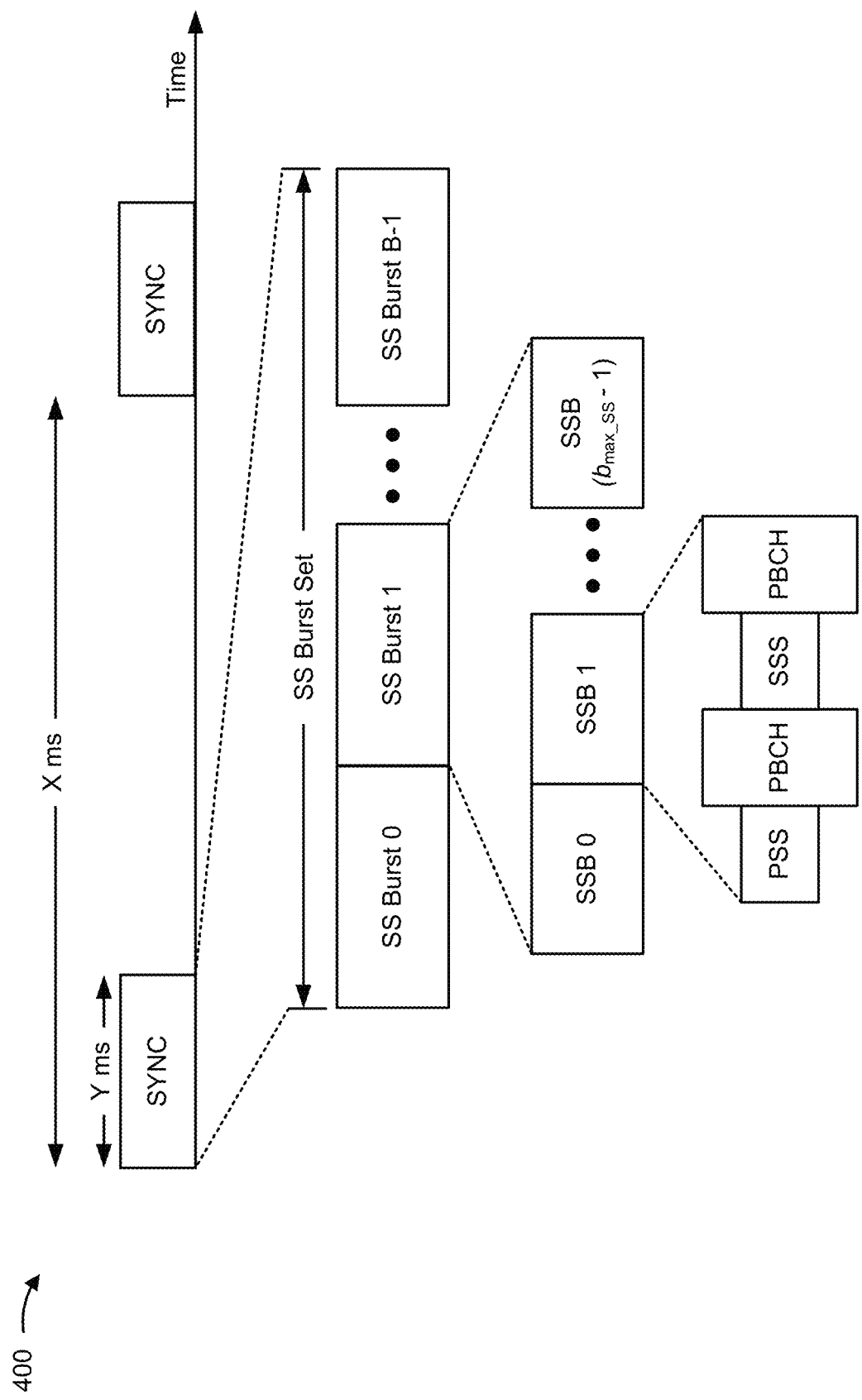
FIG. 4 is a block diagram illustrating an example synchronization signal (SS) hierarchy in a wireless communication network.

FIG. 4 is a block diagram illustrating an example synchronization signal (SS) hierarchy 400 in a wireless communication network. As shown in FIG. 4, the SS hierarchy 400 may include an SS burst set, which may include a plurality of SS bursts (shown as SS burst 0 through SS burst B-1, where B is a maximum number of repetitions of the SS burst that may be transmitted by the base station 110). As further shown, each SS burst may include one or more SS blocks (SSBs) (shown as SSB 0 through SSB (bmax_SS-1), where bmax_SS-1 is a maximum number of SSBs that can be included in an SS burst). In some aspects, different SSBs, within an SS burst set, may be beam-formed differently (e.g., using beam sweeping). Furthermore, corresponding SSBs in different SS burst sets (e.g., SSBs that have the same index in different SS burst sets) may be transmitted on the same beam. An SS burst set may be periodically transmitted by a base station 110 according to a periodicity for repetition of the SS burst set, such as every X milliseconds (ms) (e.g., every 5 ms, every 10 ms, every 20 ms, every 40 ms, every 80 ms, every 160 ms, and/or the like). In some aspects, an SS burst set may have a fixed or dynamic length of Y ms (e.g., 5 ms, 10 ms, 20 ms, and/or the like).

An SSB includes resources that carry a primary synchronization signal (PSS), a secondary synchronization signal (SSS), a physical broadcast channel (PBCH), and/or other synchronization signals and/or synchronization channels. In some aspects, multiple SSBs are included in an SS burst, and the PSS, the SSS, and/or the PBCH may be the same across each SSB of the SS burst. In some aspects, the SSB may be at least four symbol periods in length, where each symbol carries one or more of the PSS (e.g., occupying one symbol), the SSS (e.g., occupying one symbol), and/or the PBCH (e.g., occupying two symbols). In some aspects, the PBCH may occupy more resource blocks and/or frequency locations than the PSS and/or the SSS. In some aspects, an SSB may be referred to as an SS/PBCH.

In some aspects, the symbols of an SSB are consecutive, as shown in FIG. 4. In some aspects, the symbols of an SSB are non-consecutive. Similarly, in some aspects, two or more consecutive SSBs of the SS burst may be transmitted in consecutive radio resources (e.g., consecutive symbol periods) during one or more slots. Additionally, or alternatively, two or more consecutive SSBs of the SS burst may be transmitted in non-consecutive radio resources.

In some aspects, the SS bursts may have a burst period, whereby the SSBs of the SS burst are transmitted by the base station 110 according to the burst period. In other words, the SSBs may be repeated across each SS burst. In some aspects, the SS burst set may have a burst set periodicity, whereby the SS bursts of the SS burst set are transmitted by the base station 110 according to the fixed burst set periodicity. In other words, the SS bursts may be repeated across each SS burst set.

The base station 110 may transmit system information, such as one or more system information blocks (SIBs) on a physical downlink shared channel (PDSCH) in certain slots. The base station 110 may transmit control information/data on a physical downlink control channel (PDCCH) in C symbols of a slot, where C may be configurable for each slot. In some aspects, the base station 110 may transmit traffic data and/or other data on the PDSCH in the remaining symbol periods of each slot.

In some aspects, the time locations of the SSBs within the SS burst set may be fixed (e.g., within a 5 ms time period or another time period occupied by the SS burst set). For example, the SSBs may occupy the same symbols in each SS burst set, and those symbols may not be configurable by the base station 110. As a result, SSBs having the same index (e.g., the same index value) may occur in the same set of symbols (e.g., the same 4 symbols) across each SS burst set. A base station 110 may transmit the SSBs, and the UE 120 may detect an SSB and use an index of the SSB to determine a cell timing (e.g., in association with initial network access, in association with a mobility scenario where the UE 120 is connected to a serving cell and determines cell timing for one or more neighbor cells, and/or the like).

As indicated above, FIG. 4 is provided as an example. Other examples may differ from what is described with regard to FIG. 4.

Figure 5:
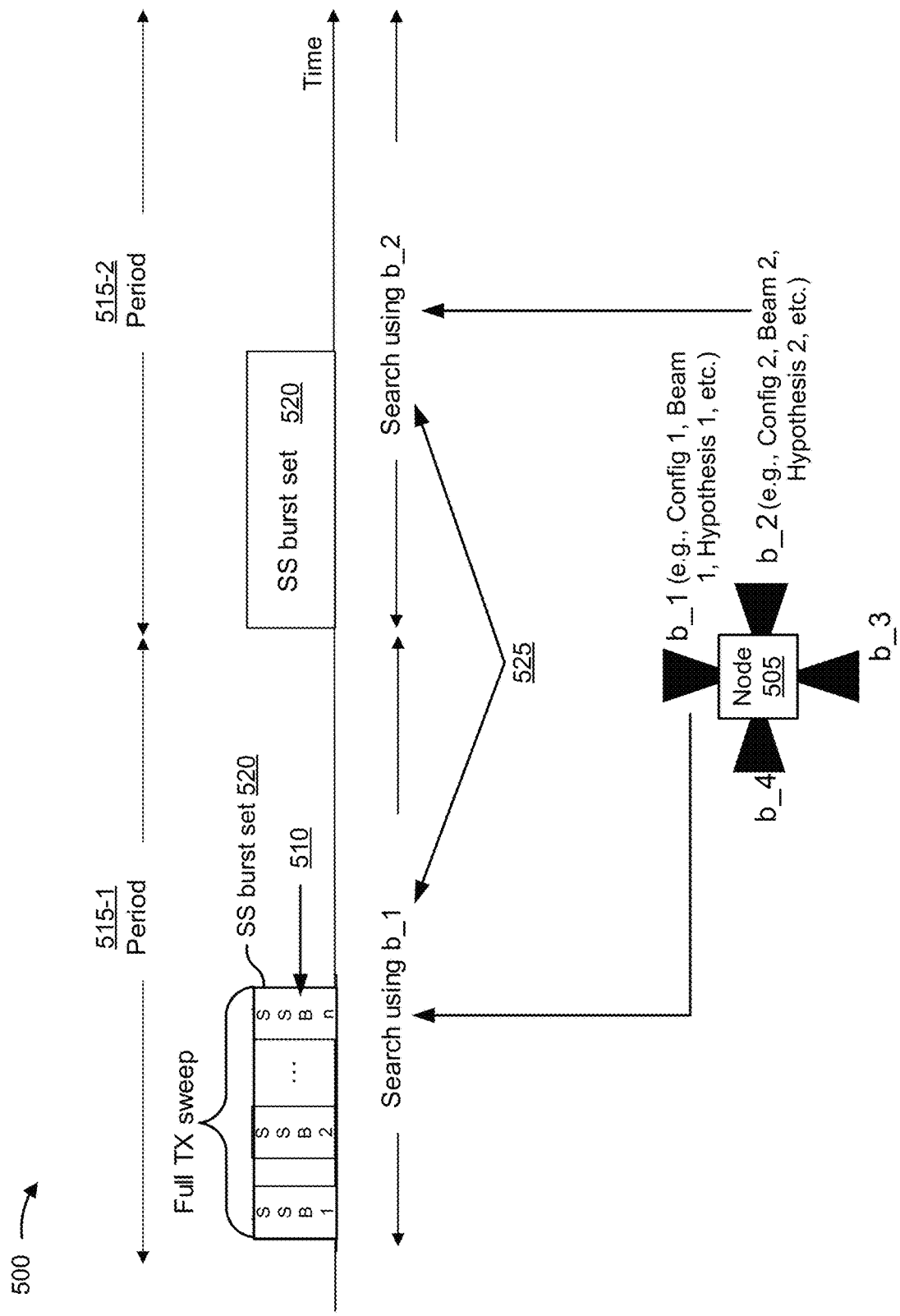
FIGS. 5-10 are diagrams illustrating examples relating to synchronization signal monitoring using multiple configurations within a synchronization signal period, in accordance with various aspects of the present disclosure.

FIG. 5 is a diagram illustrating an example 500 relating to synchronization signal monitoring using multiple configurations within a synchronization signal period, in accordance with various aspects of the present disclosure.

As shown in FIG. 5, a wireless node 505 (e.g., a UE 120, a base station 110, an IAB node, and/or the like) may monitor for SSBs 510 (shown as SSB 1, SSB 2, through SSB n) or other reference signals according to a default periodicity of a reference signal period. The default periodicity is shown as a synchronization signal (SS) period 515 (e.g., an SS burst set period and/or the like), shown as a first SS period 515-1 and a second SS period 515-2. The default periodicity may be a default periodicity for repetition of an SS burst set 520 or another reference signal or set of reference signals. For example, the default periodicity may be 20 ms, 80 ms, and/or the like. In some cases, the default periodicity may be predetermined (e.g., according to a wireless communication standard). The default periodicity may be used by the wireless node 505 to combine multiple instances of SSBs (e.g., SSBs having the same index across SS periods 515) to reduce noise, to determine when to search on a different synchronization raster (e.g., when a search over a number of SS periods 515 fails to acquire an SSB 510), and/or to search for SSBs 510 using multiple configurations (e.g., multiple receive (Rx) beams, multiple Rx antenna arrays, multiple frequency offset hypotheses, and/or the like).

For example, as shown by reference number 525, the wireless node 505 may search for (e.g., monitor for) SSBs 510 using a first configuration (shown as b_1) in a first SS period 515-1 having the default periodicity (e.g., a duration equal to the default periodicity), and may search for SSBs 510 using a second configuration (shown as b_2) in a second SS period 515-2 having the default periodicity. For example, the wireless node 505 may use a first set of Rx beams (e.g., b_1) to monitor for SSBs 510 in the first SS period 515-1, and may use a second set of Rx beams (e.g., b_2) to monitor for SSBs 510 in the second SS period 515-2. Similarly, the wireless node 505 may use a third set of Rx beams (e.g., b_3) to monitor for SSBs 510 in a third SS period, may use a fourth set of Rx beams (e.g., b_4) to monitor for SSBs 510 in a fourth SS period, and/or the like. As used herein, a set of Rx beams may refer to one or more Rx beams. Different SSBs 510 may be transmitted over time, as shown.

For example, the wireless node 505 may have 8 Rx beams to use to search for SSBs 510. For example, the wireless node 505 may have 4 antenna subarrays and 2 polarizations of beams to be used to search for SSBs 510, resulting in 8 possible Rx beam combinations. Further, the wireless node 505 may include 2 digital chains (e.g., Rx chains). In this case, the wireless node 505 may have a capability of searching using 2 Rx beams concurrently (e.g., 2 polarizations at a time), for a total of 4 sets of Rx beams to be used to search for SSBs 510. Because the wireless node 505 searches using 2 Rx beams at a time, the wireless node 505 may spread the search for SSBs 510 over 4 SS periods to check all of the Rx beams that can be used by the wireless node 505.

In some cases, if the wireless node 505 finds (e.g., obtains, acquires, and/or the like) an SSB 510 in the first SS period 515-1 using the first configuration (e.g., a first set of Rx beams), then the wireless node 505 may stop searching for SSBs 510 and may proceed to use information in the found SSB 510 to communicate with the base station 110 (e.g., to acquire system information). If the wireless node 505 does not find an SSB 510 in the first SS period 515-1, then the wireless node 505 may switch to (e.g., configure) the second configuration, and may search for SSBs 510 in the second SS period 515-2 using the second configuration. The wireless node 505 may proceed in a similar manner across multiple SS periods 515 using different configurations until an SSB 510 is found. Alternatively, the wireless node 505 may use the first configuration across multiple SS periods 515 before switching to the second configuration. In this case, the wireless node 505 may combine samples, acquired using the first configuration, across multiple periods to reduce noise. If the wireless node 505 does not find any SSBs 510 after a threshold amount of time and/or a threshold number of SS periods 515 (e.g., after searching using all possible configurations and/or Rx beams), then the wireless node 505 may switch to a different synchronization raster and may conduct a new search on that synchronization raster in a similar manner as described above.

In some cases, a base station 110 (or another transmitter) may transmit SS burst sets (or other sets of reference signals) with a periodicity that is shorter than the default periodicity.

For example, when the default (e.g., predetermined) periodicity is 20 ms, the base station 110 may transmit SS burst sets with a periodicity of less than 20 ms, such as 10 ms, 5 ms, and/or the like. Similarly, when the default periodicity is 80 ms, the base station 110 may transmit SS burst sets with a periodicity of less than 80 ms, such as 40 ms, 20 ms, 10 ms, and/or the like. However, because the wireless node 505 searches for SSBs as part of an initial network access procedure, the wireless node 505 would not be notified regarding whether the base station 110 is using a shorter periodicity than the default periodicity.

When a wireless node 505 has multiple configurations to be used to search for SSBs or other reference signals, switching between configurations after the default periodicity has expired may increase latency and consume excess battery power when the base station 110 transmits SS burst sets with a periodicity that is less than the default periodicity. Some techniques and apparatuses described herein permit the wireless node 505 to use multiple configurations to search for SSBs within multiple intervals of a single SS burst set, thereby reducing latency (e.g., of SSB acquisition, of acquisition of system information, of network access, and/or the like) and conserving battery power of the wireless node 505 (e.g., that would otherwise be used to search for SSBs for a longer amount of time). Additional details are provided below.

Although FIG. 5 shows example aspects of the disclosure in a millimeter wave (mmW) system that uses SSBs corresponding to beams, some aspects of the disclosure may be applied to non-mmW systems. Additionally, or alternatively, although some aspects are described herein in connection with SSBs, aspects described herein may apply to other types of reference signals that are transmitted and/or monitored according to a periodicity (e.g., a default periodicity), such as a sidelink discovery signal, among other examples.

As indicated above, FIG. 5 is provided as an example. Other examples may differ from what is described with respect to FIG. 5.

Figure 6A:
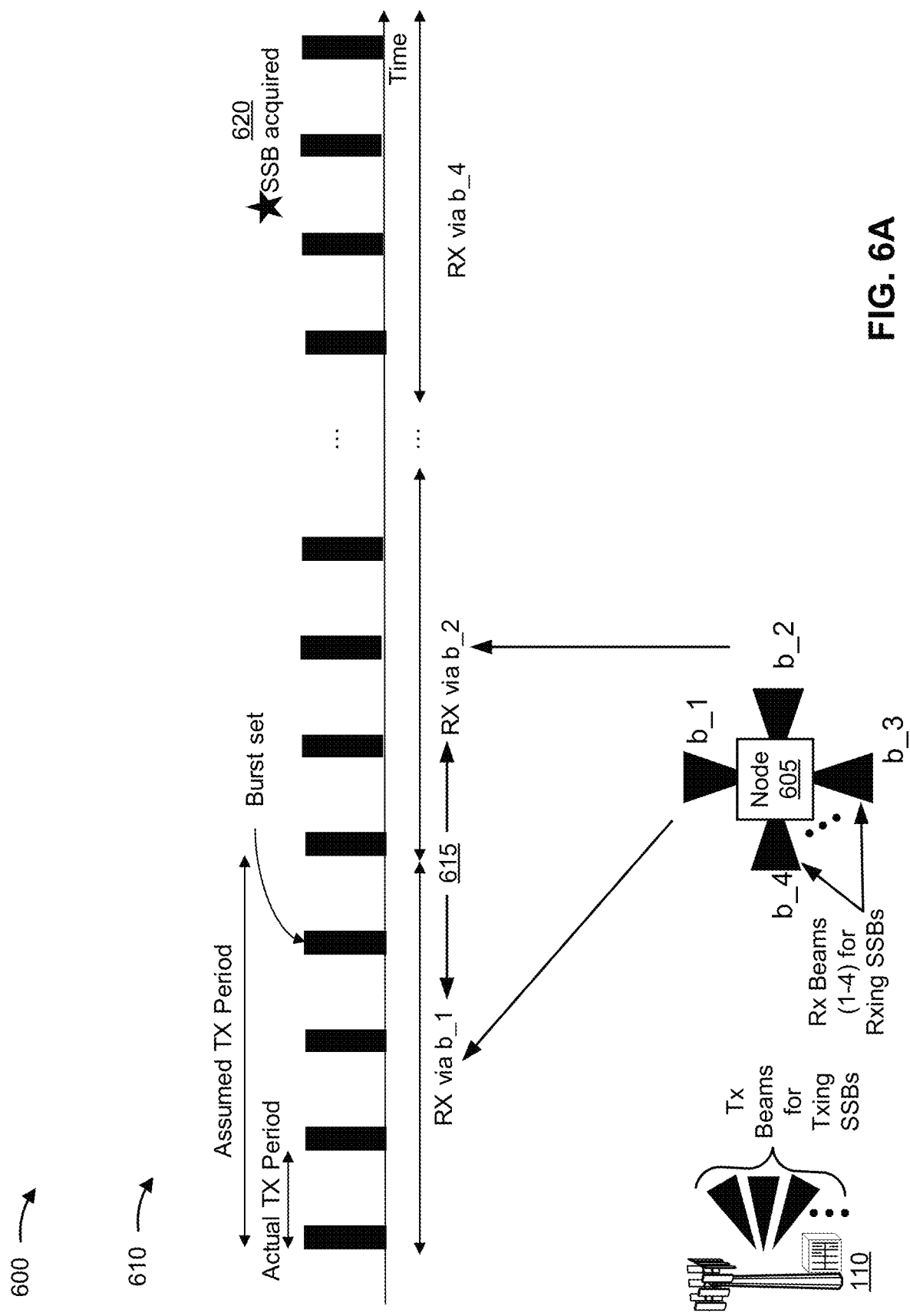
Figure 6B:
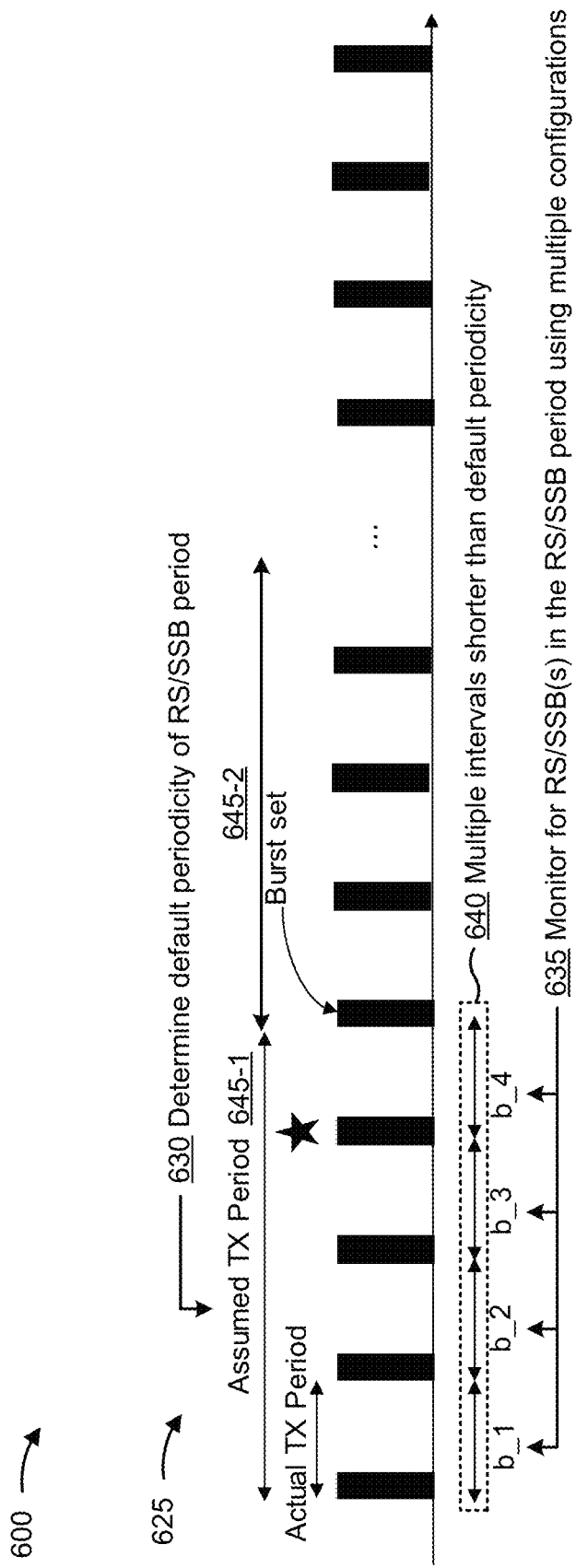
Figure 6B:
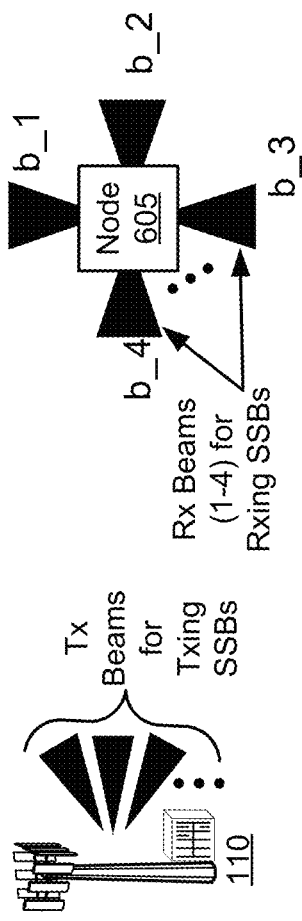

FIGS. 6A and 6B are diagrams illustrating an example 600 relating to synchronization signal monitoring using multiple configurations within a synchronization signal period, in accordance with various aspects of the present disclosure.

As shown in FIG. 6A, a wireless node 605 may search for SSBs transmitted by a base station 110 in an SS burst set (shown as "Burst set"). In some aspects, the base station 110 may include a node in an IAB network, such as an IAB donor, an IAB node, and/or the like. In some aspects, the wireless node 605 may include a UE 120, another base station 110, an IAB node, and/or the like. As described above, the base station 110 may transmit SSBs via different beams (e.g., transmit (Tx) beams) within an SS burst set, and the wireless node 605 may search for SSBs by switching between configurations (e.g., Rx configurations, Rx beams, and/or the like) over time. An Rx configuration may include, for example, an Rx beam used to monitor for and/or receive communications, a polarization used to monitor for and/or receive communications, a frequency offset hypothesis used to monitor for and/or receive communications, a precoding matrix configuration used to monitor for and/or receive communications, and/or the like.

As shown by reference number 610, in some cases, the wireless node 605 may search for SSBs using a first configuration (shown as b_1) in a first SS period (e.g., an SS burst set period), may search for SSBs using a second configuration (shown as b_2) in a second SS period, and so on. Similar to the description above in connection with FIG. 5, the wireless node 605 may switch between configurations after a default periodicity for the SS period (shown as "Assumed TX Period") has expired. For example, as shown by reference number 615, the wireless node 605 may use the first configuration for the duration of the default periodicity before switching to the second configuration, may use the second configuration for the duration of the default periodicity before switching to a third configuration, and so on. In this case, if an SSB is detected using a fourth configuration, then SSB acquisition may not occur until the fourth SS period having the default periodicity (e.g., after 4×80 ms=320 ms for a default periodicity of 80 ms), as shown by reference number 620.

As shown in FIG. 6B, and by reference number 625, in some cases, the base station 110 may transmit SS burst sets (or other sets of reference signals) with a periodicity (shown as "Actual TX Period") that is shorter than the default periodicity. In this case, when the wireless node 605 switches between configurations after the default periodicity has expired, this may unnecessarily increase latency and consume excess battery power. As described below, the wireless node 605 may switch between configurations after an interval, with a shorter periodicity than the default periodicity, has expired. In this way, the wireless node 605 may reduce latency (e.g., of SSB acquisition, of acquisition of system information, of network access, and/or the like), may conserve battery power of (e.g., that would otherwise be used to search for SSBs for a longer amount of time), and/or the like.

As shown by reference number 630, the wireless node 605 may determine a default periodicity for repetition of a reference signal period, such as an SS period, an SS burst set period, and/or the like. In some aspects, the default periodicity may be predetermined (e.g., according to a wireless communication standard). Additionally, or alternatively, the default periodicity may be stored in memory of the wireless node 605 (e.g., according to a predetermined valued).

In some aspects, the default periodicity may be determined by the wireless node 605 based at least in part on a signal received by the wireless node 605. For example, the wireless node 605 may receive the signal from a base station 110 in association with an initial access procedure for a first radio access technology (RAT) (e.g., in a non-standalone mode associated with multiple RATs), and the signal may indicate a default periodicity for an initial access procedure for a second RAT. For example, the first RAT may be an LTE RAT, the second RAT may be an NR RAT, and the wireless node 605 may operate in a non-standalone mode with the first RAT and the second RAT (e.g., a dual connectivity mode between the first RAT and the second RAT). Additionally, or alternatively, the wireless node 605 may receive the signal from a base station 110 in association with a prior network connection, and may use the default periodicity, indicated in the signal, for establishing a network connection at a later time.

As shown by reference number 635, the wireless node 605 may monitor for one or more reference signals (e.g., SSBs) in the reference signal period (e.g., SS burst set period) using a plurality of configurations for a plurality of intervals (e.g., a corresponding plurality of intervals, in some aspects) of the reference signal period. As shown by reference number 640, each interval may be shorter than the default periodicity. For example, the wireless node 605 may search for SSBs using a first configuration (shown as b_1) in a first interval having a duration less than the default periodicity, may search for SSBs using a second configuration (shown as b_2) in a second interval having a duration less than the default periodicity, may search for SSBs using a third configuration (shown as b_3) in a third interval having a duration less than the default periodicity, may search for SSBs using a fourth configuration (shown as b_4) in a fourth interval having a duration less than the default periodicity, and/or the like. In some aspects, the wireless node 605 may use a different set of Rx beams (e.g., one or more Rx beams) for different configurations. In some aspects, the base station 110 may indicate, to the wireless node 605, the plurality of configurations to be used by the wireless node 605, an order in which the plurality of configurations are to be used by the wireless node 605 (e.g., a same order across reference signal periods, different orders across reference signal periods, and/or the like).

When the wireless node 605 finds (e.g., obtains, acquires, and/or the like) an SSB (e.g., using a particular configuration), then the wireless node 605 may stop searching for SSBs and may proceed to use information in the found SSB to communicate with the base station 110 (e.g., to acquire system information). In some aspects, the UE 120 may communicate with the base station 110 using the particular configuration used to acquire the SSB.

FIG. 6B shows the wireless node 605 using a plurality of configurations for a corresponding plurality of intervals. For example, the wireless node 605 uses a first configuration for a first interval, a second configuration for a second interval, and so on. In some aspects, the wireless node 605 may use a different configuration for each interval within the default periodicity. However, in some aspects, the wireless node 605 may use the same configuration in multiple intervals within the default periodicity. For example, in some aspects, at least one configuration corresponds to more than one interval within the default periodicity.

In some aspects, the wireless node 605 may determine a number of intervals, within the default periodicity, based at least in part on a number of receive beams that the wireless node 605 uses to communicate, a number of Rx beams that the wireless node 605 uses for concurrent communications, a number of configurations that the wireless node uses to monitor for the one or more reference signals (e.g., which may include the number of Rx beams), and/or the like. In example 600, the wireless node 605 may have a capability to use 8 Rx beams to search for SSBs, and may have a capability of communicating using 2 Rx beams concurrently. In this example, to search using all of the Rx beams, the wireless node 605 may require 4 intervals. Thus, the wireless node 605 may partition the reference signal period having the default periodicity into four intervals so that the wireless node 605 can search using all Rx beams in the default periodicity. Alternatively, the wireless node 605 may partition the reference signal period having the default periodicity into fewer than four intervals, and may search using fewer than four (but greater than one) Rx beams in the default periodicity.

Additionally, or alternatively, the wireless node 605 may determine a length of one or more intervals, of the plurality of intervals, based at least in part on a number of receive beams that the wireless node 605 uses to communicate, a number of Rx beams that the wireless node 605 uses for concurrent communications, a number of configurations that the wireless node uses to monitor for the one or more reference signals, and/or the like. Additionally, or alternatively, the wireless node 605 may determine a length of one or more intervals based at least in part on the default periodicity. In some aspects, a length of an interval may be referred to as a dwell periodicity. In some aspects, the wireless node 605 may determine the dwell periodicity by dividing the default periodicity by the number of Rx beams (e.g., the total number of Rx beams of the wireless node 605 or the total number of Rx beams divided by the number of Rx beams that can be used concurrently by the wireless node 605). In some aspects, the wireless node 605 may determine the dwell periodicity by dividing the default periodicity by the number of configurations.

As described in more detail below, in some aspects, the wireless node 605 may use a different order of configurations across different reference signal periods. For example, the wireless node 605 may apply a first order of b_1, b_2, b_3, and b_4 for the configurations in a first reference signal period 645-1, may apply a second order of b_2, b_3, b_4, b_1 for the configurations in a second reference signal period 645-2, and so on.

By switching between configurations across multiple intervals within a default periodicity for a reference signal period (e.g., when a timer corresponding to the length of an interval expires), the wireless node 605 may detect an SSB faster, thereby reducing latency and conserving battery power. For example, when an SSB is detected using a fourth configuration, then SSB acquisition may occur in the first SS period having the default periodicity (e.g., after 80 ms for a default periodicity of 80 ms), which is faster than when the wireless node 605 waits until expiration of the default periodicity before switching configurations (e.g., which would result in a latency of 320 ms, as described above).

As indicated above, FIGS. 6A and 6B are provided as examples. Other examples may differ from what is described with respect to FIGS. 6A and 6B.

Figure 7:
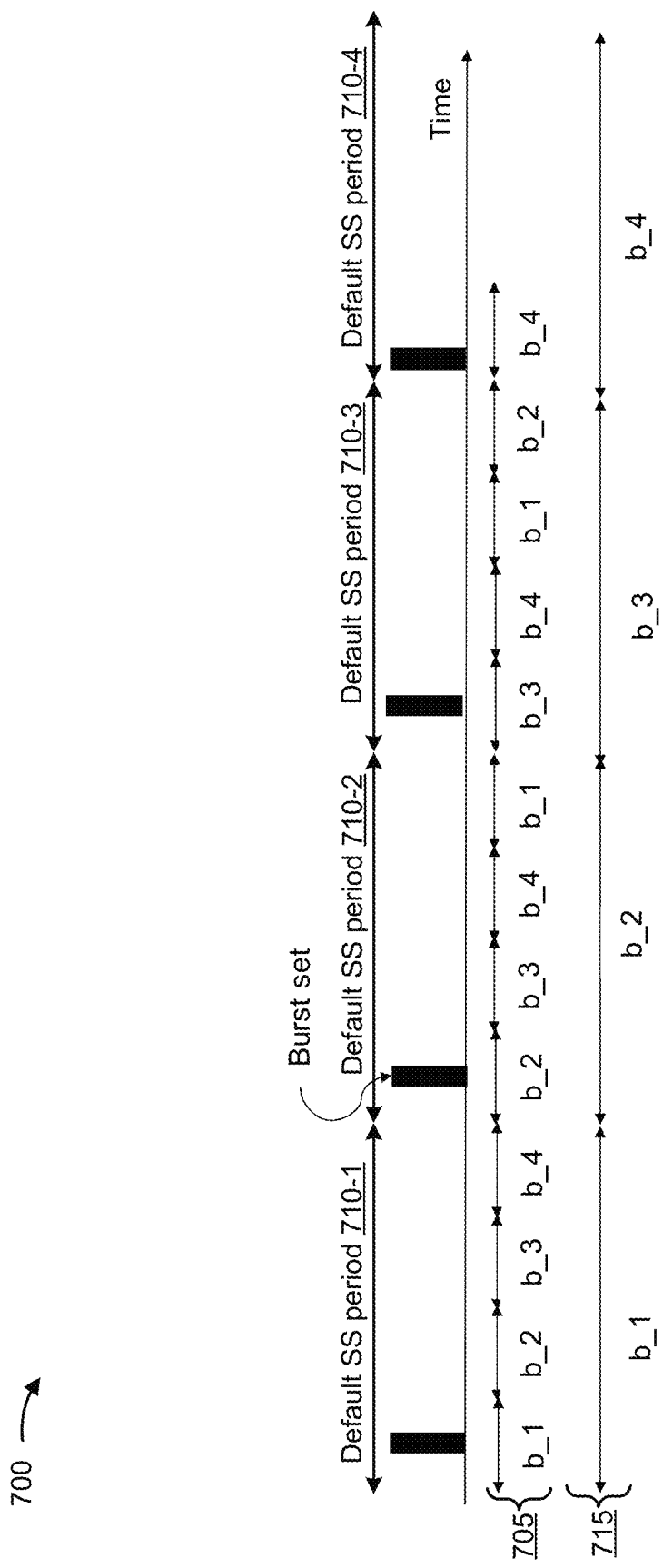

FIG. 7 is a diagram illustrating an example 700 relating to synchronization signal monitoring using multiple configurations within a synchronization signal period, in accordance with various aspects of the present disclosure.

As shown by reference number 705, in some aspects, the wireless node 605 may use a different order of configurations across different reference signal periods. For example, the wireless node 605 may apply a first order of b_1, b_2, b_3, and b_4 for the configurations in a first default SS period 710-1 (e.g., an SS period having the default periodicity), may apply a second order of b_2, b_3, b_4, b_1 for the configurations in a second default SS period 710-2, may apply a third order of b_3, b_4, b_1, b_2 for the configurations in a third default SS period 710-3, may apply a fourth order of b_4, b_1, b_2, b_3 for the configurations in a fourth default SS period 710-4, and/or the like.

In some aspects, the wireless node 605 may determine an order for the configurations in an SS period based at least in part on an order in which the configurations were applied in a preceding SS period. For example, the wireless node 605 may modify a preceding order using a function (e.g., a cyclic function) to determine a succeeding order. In some aspects, the order for the configurations in an SS period may be a permutation of an order used in a preceding SS period. Additionally, or alternatively, the order for the configurations in an SS period may be a cyclic shift (e.g., a circular shift) of an order using in a preceding SS period.

By changing an order of the configurations across different default SS periods, the wireless node 605 may maintain performance when SS burst sets are transmitted using the default periodicity. For example, the wireless node 605 may obtain an SSB with about the same average latency or about the same worst case latency as when the wireless node 605 maintains the same configuration for the entire default SS period before switching to a new configuration for a subsequent default SS period, as shown by reference number 715. However, performance may be improved by changing configurations within intervals of a default SS period when SS burst sets are transmitted with a periodicity that is less than the default periodicity, as described elsewhere herein.

In some aspects, the wireless node 605 may use the same order of configurations across consecutive default SS periods that are grouped together. For example, the wireless node 605 may group default SS periods into multiple groups of default SS periods. A group of default SS periods may include multiple consecutive default SS periods. The wireless node 605 may use the same order of configurations for each default SS period in a first group, and may use a different order of configurations for default SS periods in different groups. For example, the wireless node 605 may use a first order of configurations (e.g., across intervals) for default SS periods in a first group, may use a second order of configurations for default SS periods in a second group, and so on. In this way, the wireless node 605 may combine SSBs from multiple default SS periods within the same group to reduce noise.

As indicated above, FIG. 7 is provided as an example. Other examples may differ from what is described with respect to FIG. 7.

Figure 8:
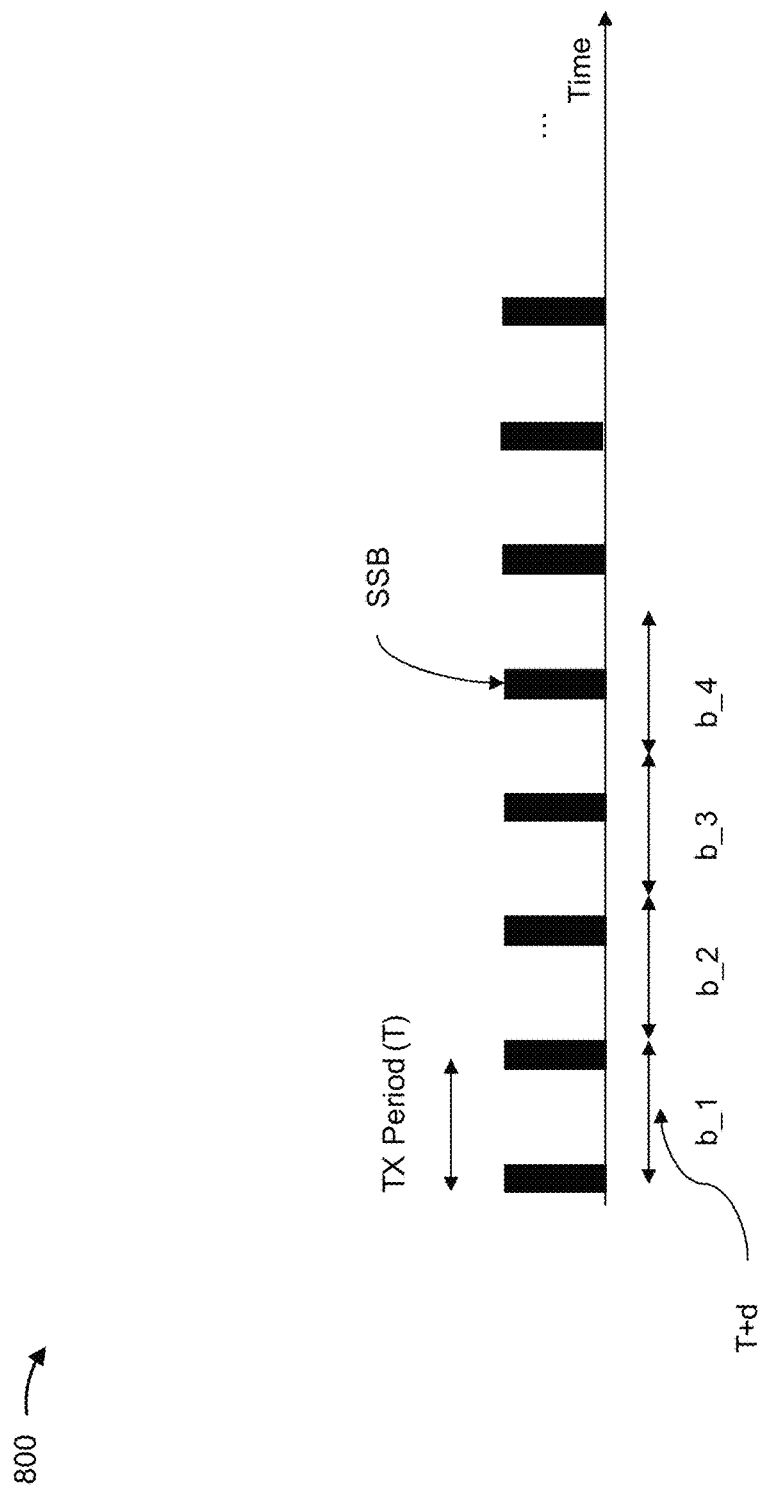

FIG. 8 is a diagram illustrating an example 800 relating to synchronization signal monitoring using multiple configurations within a synchronization signal period, in accordance with various aspects of the present disclosure.

As described above, in some aspects, the wireless node 605 may determine a dwell periodicity (T) of an interval by dividing the default periodicity (P) by the number of Rx beams (M) that the wireless node 605 is to use to search for SSBs (or the number of sets of Rx beams (M) when the wireless node 605 searches concurrently using a set of Rx beams, or the number of configurations (M) that the wireless node 605 uses to search for SSBs). However, using this dwell periodicity may result in missing an SSB when an interval starts in the middle of an SSB (e.g., when the interval starts in the second, third, or fourth symbol of the SSB). To account for this, the wireless node 605 may set the dwell periodicity (T) to be greater than P/M. For example, the wireless node may set the dwell periodicity by adding an offset (d) to P/M, shown as "T+d" in FIG. 8. However, this may lead to additional latency and/or battery consumption due to a gap where a specific configuration is not used to monitor for SSBs, as described below in connection with FIG. 9.

As indicated above, FIG. 8 is provided as an example. Other examples may differ from what is described with respect to FIG. 8.

Figure 9:
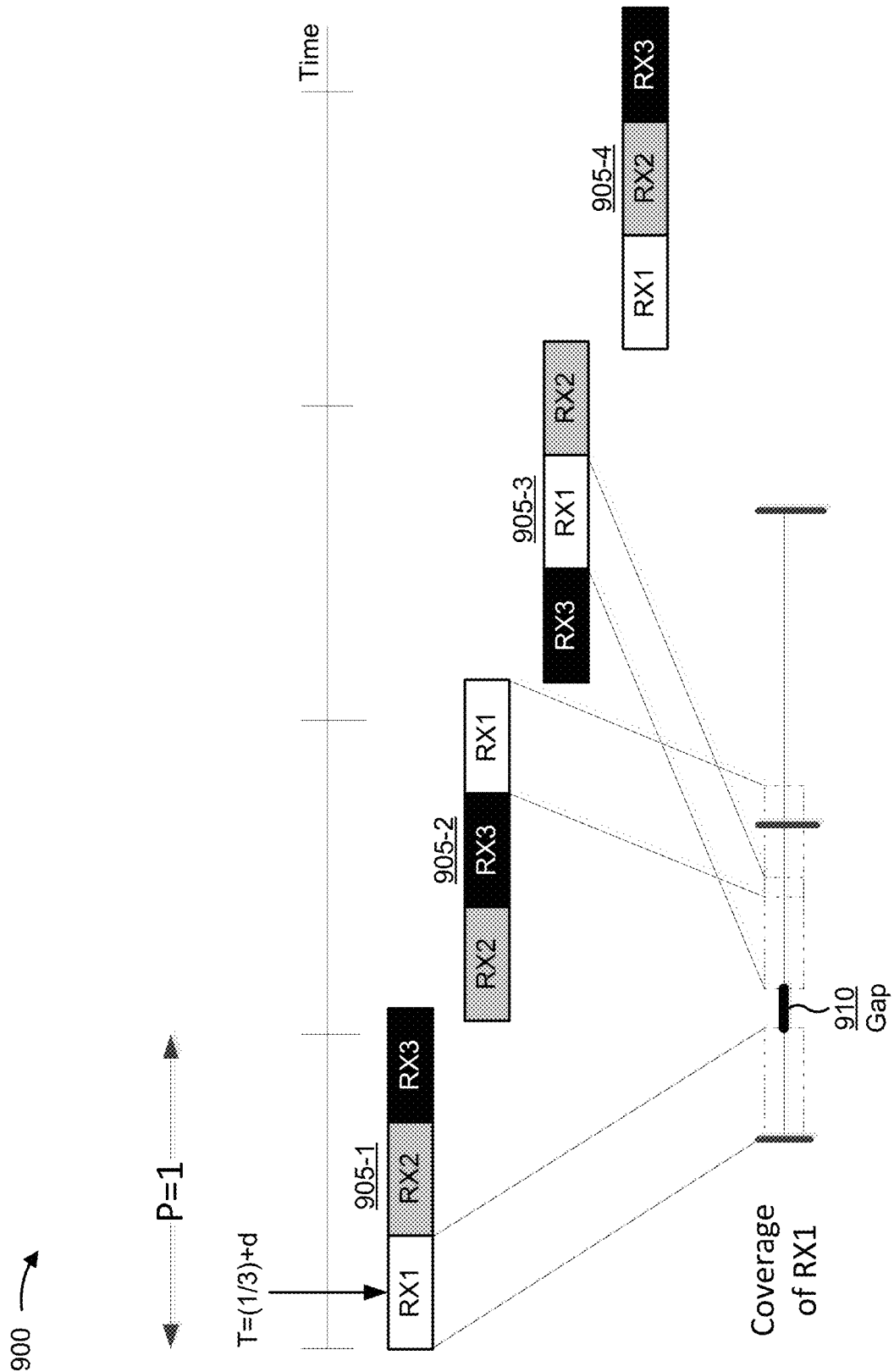

FIG. 9 is a diagram illustrating an example 900 relating to synchronization signal monitoring using multiple configurations within a synchronization signal period, in accordance with various aspects of the present disclosure.

In example 900, the wireless node 605 uses three configurations to monitor for SSBs in different intervals of an SS period having a default periodicity, shown as a first configuration RX1, a second configuration RX2, and a third configuration RX3. As shown, the default periodicity (P) is shown as having a value of 1. The dwell periodicity is shown as having a value of T=(⅓)+d, based at least in part on the default periodicity (P=1), the number of Rx configurations to be used (M=3), and the offset (d).

In example 900, the wireless node 605 uses the same dwell periodicity for all three configurations, and the wireless node 605 uses a different order of configurations across SS periods (e.g., RX1, RX2, RX3 in a first SS period 905-1; RX2, RX3, RX1 in a second SS period 905-2; RX3, RX1, RX2 in a third SS period 905-3; and so on). In this case, each configuration does not cover a full scan across all time points of an SS period. As a result, an SSB may be missed using a particular configuration.

For example, as shown by reference number 910, when the time periods covered using the first configuration in different SS periods are aggregated, there is a gap in coverage for a time period. If an SSB that would otherwise be received using the first configuration is transmitted during this time period in an SS period, then that SSB may be missed by the wireless node 605. This may increase latency and increase battery consumption because one or more extra SS periods (shown as SS period 905-4) may be needed to achieve a full scan of all time points of an SS period using the first configuration. To eliminate the need for extra SS period(s), and to reduce latency, the wireless node 605 may use different lengths for different intervals within an SS period, and/or may use different length for a specific configuration across SS periods, as described in more detail below in connection with FIG. 10.

As indicated above, FIG. 9 is provided as an example. Other examples may differ from what is described with respect to FIG. 9.

Figure 10:
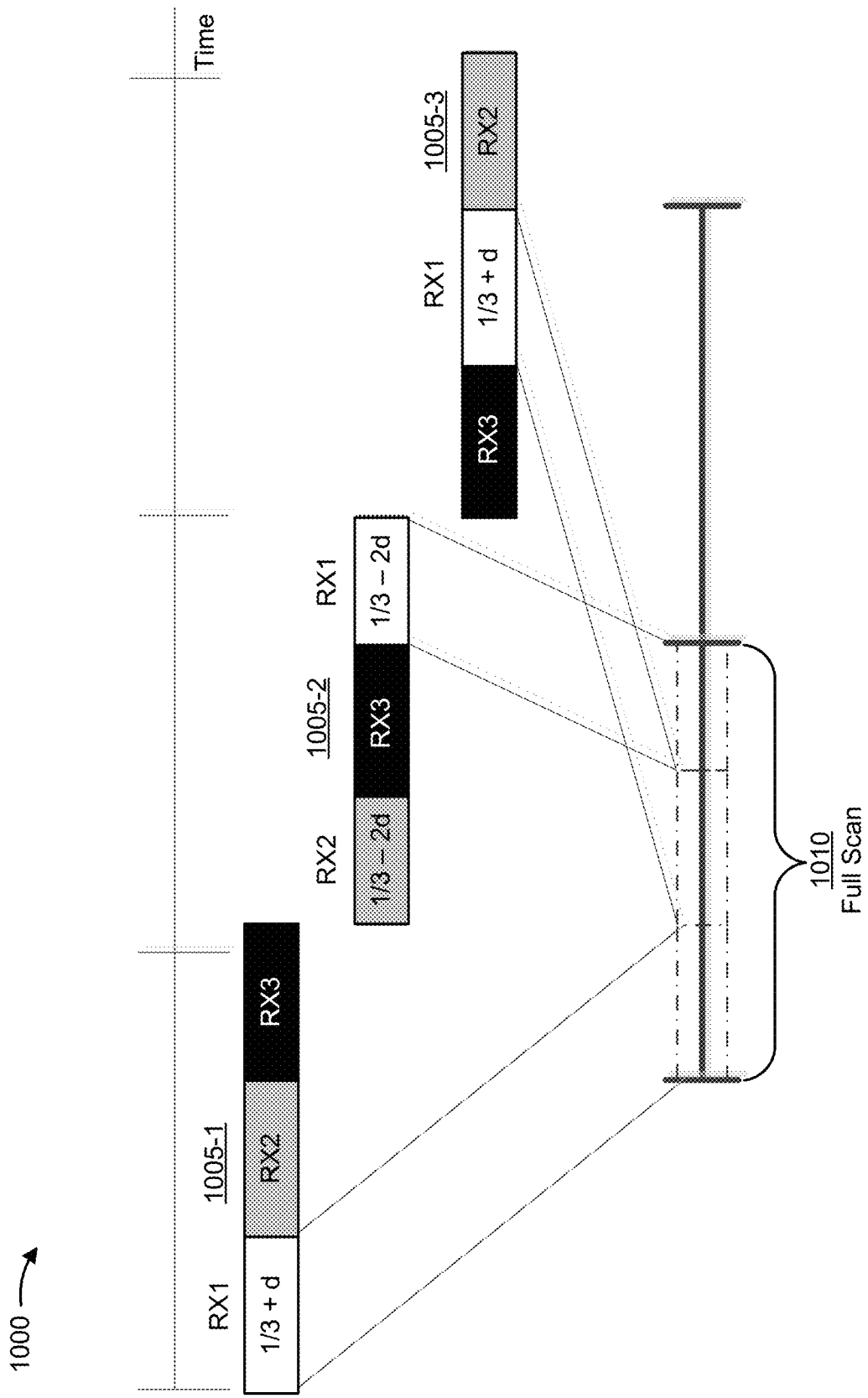

FIG. 10 is a diagram illustrating an example 1000 relating to synchronization signal monitoring using multiple configurations within a synchronization signal period, in accordance with various aspects of the present disclosure.

As shown in FIG. 10, in some aspects, the wireless node 605 may use different lengths for the same interval across SS periods 1005 (e.g., an interval in which the same configuration is used). For example, the wireless node 605 may use a first length (shown as ⅓+d) for an interval corresponding to RX1 in a first SS period 1005-1, and may use a second length (shown as ⅓−2d) for an interval correspond to RX1 in a second SS period 1005-2. Additionally, or alternatively, the wireless node 605 may use different lengths for different intervals within an SS period 1005. For example, the wireless node 605 may use a first length (e.g., ⅓−2d) for an interval corresponding to RX1 in the second SS period 1005-2, and may use a second length (e.g., ⅓+d) for an interval corresponding to RX3 in the second SS period 1005-2. In this way, as shown by reference number 1010, the wireless node 605 can achieve a full scan without requiring extra SS periods (e.g., as described above in connection with FIG. 9), thereby reducing latency and conserving battery power.

As indicated above, FIG. 10 is provided as an example. Other examples may differ from what is described with respect to FIG. 10.

Figure 11:
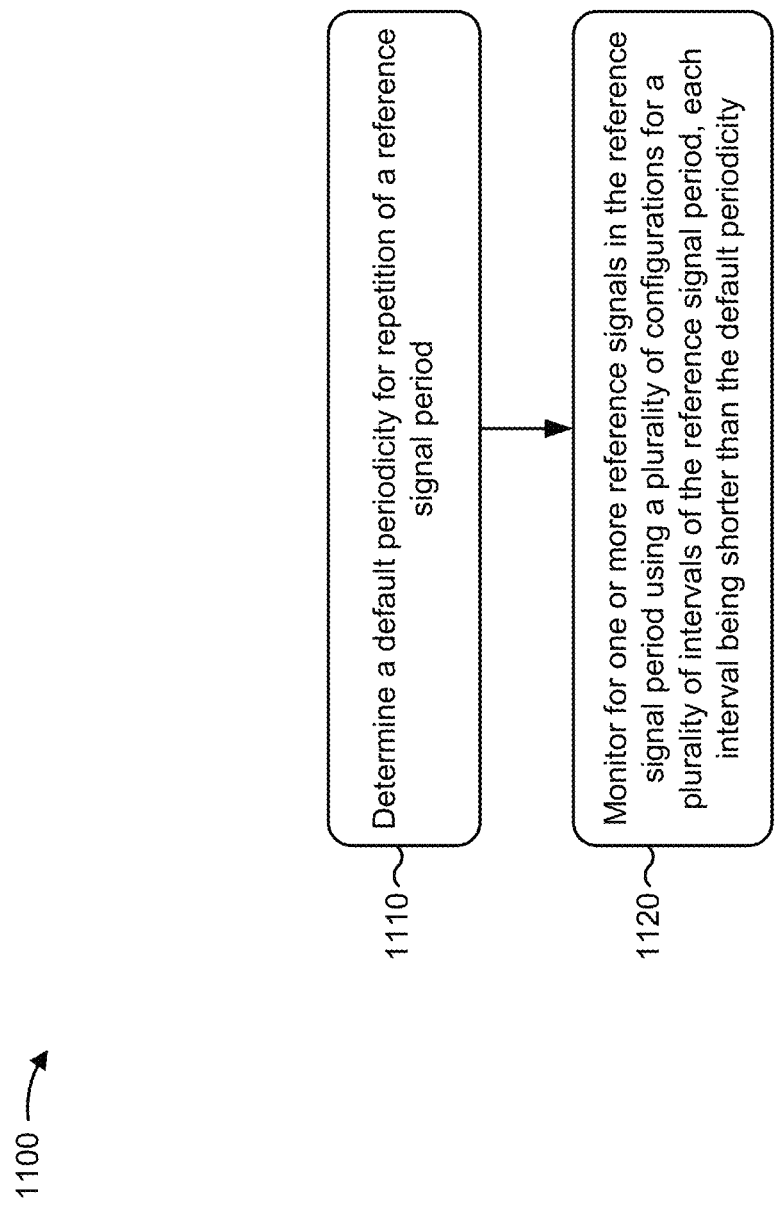
FIGS. 11 and 12 are diagrams illustrating example processes relating to synchronization signal monitoring using multiple configurations within a synchronization signal period, in accordance with various aspects of the present disclosure.

FIG. 11 is a diagram illustrating an example process 1100 performed, for example, by a wireless node, in accordance with various aspects of the present disclosure. Example process 1100 is an example where a wireless node (e.g., wireless node 505, wireless node 605, UE 120, base station 110, an IAB node, and/or the like) performs operations relating to synchronization signal monitoring using multiple configurations within a synchronization signal period.

As shown in FIG. 11, in some aspects, process 1100 may include determining a default periodicity for repetition of a reference signal period (block 1110). For example, the wireless node (e.g., using controller/processor 280 and/or the like) may determine a default periodicity for repetition of a reference signal period, as described above.

As further shown in FIG. 11, in some aspects, process 1100 may include monitoring for one or more reference signals in the reference signal period using a plurality of configurations for a plurality of intervals of the reference signal period, each interval being shorter than the default periodicity (block 1120). For example, the wireless node (e.g., using antenna 252, DEMOD 254, MIMO detector 256, receive processor 258, controller/processor 280, and/or the like) may monitor for one or more reference signals in the reference signal period using a plurality of configurations for a plurality of intervals of the reference signal period, as described above. In some aspects, each interval is shorter than the default periodicity.

Process 1100 may include additional aspects, such as any single aspect or any combination of aspects described below and/or in connection with one or more other processes described elsewhere herein.

In a first aspect, the reference signal period is a synchronization signal period.

In a second aspect, alone or in combination with the first aspect, the reference signal period is a synchronization signal burst set period.

In a third aspect, alone or in combination with one or more of the first and second aspects, the one or more reference signals are one or more synchronization signal blocks.

In a fourth aspect, alone or in combination with one or more of the first through third aspects, different configurations, of the plurality of configurations, use at least one of different receive beams, different frequency offset hypotheses, different polarizations, different precoding matrix configurations, or a combination thereof.

In a fifth aspect, alone or in combination with one or more of the first through fourth aspects, different configurations, of the plurality of configurations, use different frequency offset hypotheses.

In a sixth aspect, alone or in combination with one or more of the first through fifth aspects, an order in which the plurality of configurations is used is different across different reference signal periods having the default periodicity.

In a seventh aspect, alone or in combination with one or more of the first through sixth aspects, an order in which the plurality of configurations is used in the reference signal period is determined based at least in part on an order in which the plurality of configurations were used in a preceding reference signal period.

In an eighth aspect, alone or in combination with one or more of the first through seventh aspects, an order in which the plurality of configurations is used in the reference signal period is a permutation of an order in which the plurality of configurations were used in a preceding reference signal period.

In a ninth aspect, alone or in combination with one or more of the first through eighth aspects, an order in which the plurality of configurations is used in the reference signal period is a cyclic shift of an order in which the plurality of configurations were used in a preceding reference signal period.

In a tenth aspect, alone or in combination with one or more of the first through ninth aspects, an order in which the plurality of configurations is used is the same across different reference signal periods having the default periodicity.

In an eleventh aspect, alone or in combination with one or more of the first through tenth aspects, the plurality of configurations are applied in a first order for a first set of reference signal periods and are applied in a second order for a second set of reference signal periods.

In a twelfth aspect, alone or in combination with one or more of the first through eleventh aspects, a length of one or more intervals, of the plurality of intervals, is determined based at least in part on a number of receive beams that the wireless node uses to communicate.

In a thirteenth aspect, alone or in combination with one or more of the first through twelfth aspects, a length of one or more intervals, of the plurality of intervals, is determined based at least in part on a number of configurations that the wireless node uses to monitor for the one or more reference signals.

In a fourteenth aspect, alone or in combination with one or more of the first through thirteenth aspects, a length of one or more intervals, of the plurality of intervals, is determined based at least in part on the default periodicity.

In a fifteenth aspect, alone or in combination with one or more of the first through fourteenth aspects, a length of one or more intervals, of the plurality of intervals, is determined based at least in part on the default periodicity and a number of receive beams that the wireless node uses to communicate.

In a sixteenth aspect, alone or in combination with one or more of the first through fifteenth aspects, a length of one or more intervals, of the plurality of intervals, is determined based at least in part on the default periodicity and a number of configurations that the wireless node uses to monitor for the one or more reference signals.

In a seventeenth aspect, alone or in combination with one or more of the first through sixteenth aspects, a number of intervals included in the plurality of intervals is determined based at least in part on a number of receive beams that the wireless node uses to communicate.

In an eighteenth aspect, alone or in combination with one or more of the first through seventeenth aspects, a number of intervals included in the plurality of intervals is determined based at least in part on a number of configurations that the wireless node uses to monitor for the one or more reference signals.

In a nineteenth aspect, alone or in combination with one or more of the first through eighteenth aspects, the number of intervals is equal to the number of receive beams.

In a twentieth aspect, alone or in combination with one or more of the first through nineteenth aspects, the number of intervals is equal to the number of configurations.

In a twenty-first aspect, alone or in combination with one or more of the first through twentieth aspects, the number of intervals is less than the number of receive beams.

In a twenty-second aspect, alone or in combination with one or more of the first through twenty-first aspects, the number of intervals is less than the number of configurations.

In a twenty-third aspect, alone or in combination with one or more of the first through twenty-second aspects, a first interval of the plurality of intervals has a first length within the reference signal period and a second interval of the plurality of intervals has a second, different length in the reference signal period.

In a twenty-fourth aspect, alone or in combination with one or more of the first through twenty-third aspects, an interval in which a specific configuration is used has a first length in a first reference signal period and a second, different length in a second reference signal period.

In a twenty-fifth aspect, alone or in combination with one or more of the first through twenty-fourth aspects, the default periodicity is predetermined.

In a twenty-sixth aspect, alone or in combination with one or more of the first through twenty-fifth aspects, the default periodicity is determined based at least in part on a signal received by the wireless node.

In a twenty-seventh aspect, alone or in combination with one or more of the first through twenty-sixth aspects, process 1100 includes communicating based at least in part on an acquired reference signal of the one or more reference signals.

In a twenty-eighth aspect, alone or in combination with one or more of the first through twenty-seventh aspects, at least one configuration, of the plurality of configurations, corresponds to more than one interval of the plurality of intervals.

In a twenty-ninth aspect, alone or in combination with one or more of the first through twenty-eighth aspects, the one or more reference signals are one or more sidelink discovery signals.

In a thirtieth aspect, alone or in combination with one or more of the first through twenty-ninth aspects, the plurality of configurations are indicated to the wireless node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
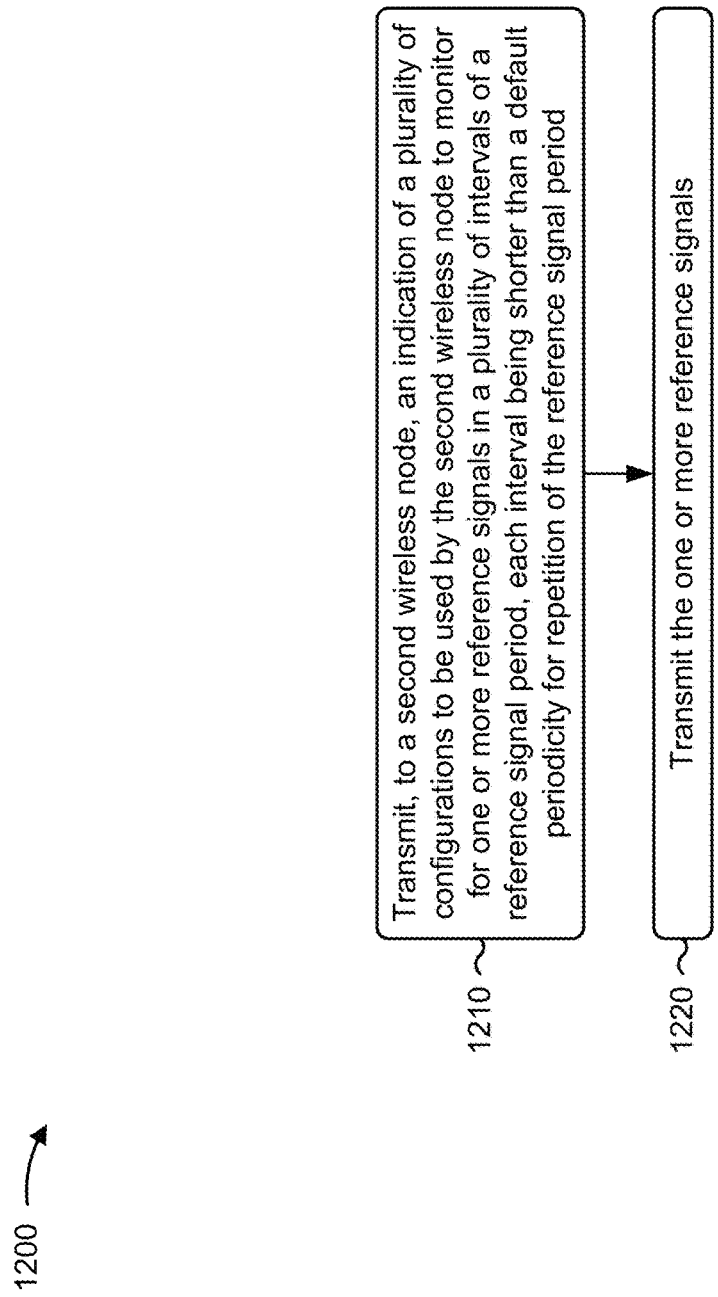

FIG. 12 is a diagram illustrating an example process 1200 performed, for example, by a first wireless node, in accordance with various aspects of the present disclosure. Example process 1200 is an example where the first wireless node (e.g., base station 110 and/or the like) performs operations relating to synchronization signal monitoring using multiple configurations within a synchronization signal period.

As shown in FIG. 12, in some aspects, process 1200 may include transmitting, to a second wireless node, an indication of a plurality of configurations to be used by the second wireless node to monitor for one or more reference signals in a plurality of intervals of a reference signal period, each interval being shorter than a default periodicity for repetition of the reference signal period (block 1210). For example, the first wireless node (e.g., using transmit processor 220, receive processor 238, controller/processor 240, memory 242, and/or the like) may transmit, to a second wireless node, an indication of a plurality of configurations to be used by the second wireless node to monitor for one or more reference signals in a plurality of intervals of a reference signal period, as described above. In some aspects, each interval is shorter than a default periodicity for repetition of the reference signal period.

As further shown in FIG. 12, in some aspects, process 1200 may include transmitting the one or more reference signals (block 1220). For example, the first wireless node (e.g., using transmit processor 220, controller/processor 240, memory 242, and/or the like) may transmit the one or more reference signals, as described above.

Process 1200 may include additional aspects, such as any single aspect or any combination of aspects described below and/or in connection with one or more other processes described elsewhere herein.

In a first aspect, different configurations, of the plurality of configurations, use at least one of different receive beams, different frequency offset hypotheses, different polarizations, different precoding matrix configurations, or a combination thereof.

In a second aspect, alone or in combination with the first aspect, process 1200 includes transmitting, to the second wireless node, an indication of an order in which the plurality of configurations are to be used across different reference signal periods having the default periodicity.

In a third aspect, alone or in combination with one or more of the first and second aspects, process 1200 includes transmitting, to the second wireless node, an indication of the default periodicity.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless node, comprising:
 determining a default periodicity for repetition of a reference signal period; and
 monitoring for one or more reference signals in the reference signal period using a plurality of configurations for a plurality of intervals of the reference signal period, wherein the reference signal period is a synchronization signal burst set period, wherein the plurality of intervals comprise a first interval within the synchronization signal burst set period and a second interval within the synchronization signal burst set period, wherein the first interval is shorter than the default periodicity, wherein the second interval is shorter than the default periodicity, and wherein a first length of the first interval is different from a second length of the second interval.

2. The method of claim 1, further comprising communicating based at least in part on an acquired reference signal of the one or more reference signals.

3. The method of claim 1, wherein the one or more reference signals are one or more synchronization signal blocks.

4. The method of claim 1, wherein different configurations of the plurality of configurations, use at least one of different receive beams, different frequency offset hypotheses, different polarizations, different precoding matrix configurations, or a combination thereof.

5. The method of claim 1, wherein an order, in which the plurality of configurations is used, is different across different reference signal periods having the default periodicity.

6. The method of claim 1, wherein an order in which the plurality of configurations is used in the reference signal period is determined based at least in part on an order in which the plurality of configurations were used in a preceding reference signal period.

7. The method of claim 1, wherein an order in which the plurality of configurations is used in the reference signal period is a permutation of an order in which the plurality of configurations were used in a preceding reference signal period or is a cyclic shift of an order in which the plurality of configurations were used in a preceding reference signal period.

8. The method of claim 1, wherein an order in which the plurality of configurations is used is the same across different reference signal periods having the default periodicity.

9. The method of claim 1, wherein the plurality of configurations are applied in a first order for a first set of reference signal periods and are applied in a second order for a second set of reference signal periods.

10. The method of claim 1, wherein a length of one or more intervals, of the plurality of intervals, is determined based at least in part on:
 a number of configurations that the wireless node uses to monitor for the one or more reference signals,
 the default periodicity, or
 a combination thereof.

11. The method of claim 1, wherein a number of intervals included in the plurality of intervals is determined based at least in part on a number of configurations that the wireless node uses to monitor for the one or more reference signals.

12. The method of claim 11, wherein the number of intervals is less than or equal to the number of configurations that the wireless node uses to monitor for the one or more reference signals.

13. The method of claim 1, wherein the first interval has the first length in a first reference signal period and a different length in a second reference signal period, and wherein the reference signal period is the first reference signal period.

14. The method of claim 1, wherein the default periodicity is predetermined or is determined based at least in part on a signal received by the wireless node.

15. The method of claim 1, wherein at least one configuration, of the plurality of configurations, corresponds to more than one interval of the plurality of intervals.

16. The method of claim 1, wherein the one or more reference signals are one or more sidelink discovery signals.

17. The method of claim 1, wherein the plurality of configurations are indicated to the wireless node.

18. A method of wireless communication performed by a first wireless node, comprising:
 transmitting, to a second wireless node, an indication of a plurality of configurations to be used by the second wireless node to monitor for one or more reference signals in a plurality of intervals of a reference signal period, wherein the reference signal period is a synchronization signal burst set period, wherein the plurality of intervals comprise a first interval within the synchronization signal burst set period and a second interval within the synchronization signal burst set period, wherein the first interval is shorter than a default periodicity for repetition of the reference signal period, and wherein a first length of the first interval is different from a second length of the second interval; and
 transmitting the one or more reference signals.

19. The method of claim 18, wherein different configurations, of the plurality of configurations, use at least one of different receive beams, different frequency offset hypotheses, different polarizations, different precoding matrix configurations, or a combination thereof.

20. The method of claim 18, further comprising transmitting, to the second wireless node, an indication of an order in which the plurality of configurations are to be used across different reference signal periods having the default periodicity.

21. The method of claim 18, further comprising transmitting, to the second wireless node, an indication of the default periodicity.

22. The method of claim 18, wherein the one or more reference signals are one or more synchronization signal blocks.

23. A wireless node, comprising:
 a memory; and
 one or more processors coupled to the memory, the one or more processors configured to:
  determine a default periodicity for repetition of a reference signal period; and
  monitor for one or more reference signals in the reference signal period using a plurality of configurations for a plurality of intervals of the reference signal period, wherein the reference signal period is a synchronization signal burst set period, wherein the plurality of intervals comprise a first interval within the synchronization signal burst set period and a second interval within the synchronization signal burst set period, wherein the first interval is shorter than the default periodicity, wherein the second interval is shorter than the default periodicity, and wherein a first length of the first interval is different from a second length of the second interval.

24. The wireless node of claim 23, wherein different configurations, of the plurality of configurations, use at least one of different receive beams, different frequency offset hypotheses, different polarizations, different precoding matrix configurations, or a combination thereof.

25. The wireless node of claim 23, wherein an order in which the plurality of configurations is used is different across different reference signal periods having the default periodicity.

26. The wireless node of claim 23, wherein a length of one or more intervals, of the plurality of intervals, is determined based at least in part on:
a number of configurations that the wireless node uses to monitor for the one or more reference signals,
the default periodicity, or
a combination thereof.

27. The wireless node of claim 23, wherein a number of intervals included in the plurality of intervals is determined based at least in part on a number of configurations that the wireless node uses to monitor for the one or more reference signals.

28. The wireless node of claim 23, wherein the one or more reference signals are one or more synchronization signal blocks.

29. A first wireless node, comprising:
a memory; and
one or more processors coupled to the memory, the one or more processors configured to:
transmit, to a second wireless node, an indication of a plurality of configurations to be used by the second wireless node to monitor for one or more reference signals in a plurality of intervals of a reference signal period, wherein the reference signal period is a synchronization signal burst set period, wherein the plurality of intervals comprise a first interval within the synchronization signal burst set period and a second interval within the synchronization signal burst set period wherein the first interval is shorter than a default periodicity for repetition of the reference signal period, and wherein a first length of the first interval is different from a second length of the second interval; and
transmit the one or more reference signals.

30. The first wireless node of claim 29, wherein different configurations, of the plurality of configurations, use at least one of different receive beams, different frequency offset hypotheses, different polarizations, or different precoding matrix configurations.

31. The first wireless node of claim 29, wherein the first wireless node is further configured to transmit, to the second wireless node, an indication of an order in which the plurality of configurations are to be used across different reference signal periods having the default periodicity.

32. The first wireless node of claim 29, wherein the one or more reference signals are one or more synchronization signal blocks.

33. A non-transitory computer-readable medium storing one or more instructions for wireless communication, the one or more instructions comprising:
one or more instructions that, when executed by one or more processors of a wireless node, cause the one or more processors to:
determine a default periodicity for repetition of a reference signal period; and
monitor for one or more reference signals in the reference signal period using a plurality of configurations for a plurality of intervals of the reference signal period, wherein the reference signal period is a synchronization signal burst set period, wherein the plurality of intervals comprise a first interval within the synchronization signal burst set period and a second interval within the synchronization signal burst set period, wherein the first interval is shorter than the default periodicity, wherein the second interval is shorter than the default periodicity, and wherein a first length of the first interval is different from a second length of the second interval.

34. The non-transitory computer-readable medium of claim 33, wherein different configurations, of the plurality of configurations, use at least one of different receive beams, different frequency offset hypotheses, different polarizations, different precoding matrix configurations, or a combination thereof.

35. The non-transitory computer-readable medium of claim 33, wherein an order in which the plurality of configurations is used is different across different reference signal periods having the default periodicity.

36. The non-transitory computer-readable medium of claim 33, wherein a length of one or more intervals, of the plurality of intervals, is determined based at least in part on:
a number of configurations that the wireless node uses to monitor for the one or more reference signals,
the default periodicity, or
a combination thereof.

37. The non-transitory computer-readable medium of claim 33, wherein a number of intervals included in the plurality of intervals is determined based at least in part on a number of configurations that the wireless node uses to monitor for the one or more reference signals.

38. The non-transitory computer-readable medium of claim 33, wherein the first length is within the reference signal period and the second length is within the reference signal period.

39. The non-transitory computer-readable medium of claim 33, wherein the first interval has the first length in a first reference signal period and a different length in a second reference signal period, and wherein the reference signal period is the first reference signal period.

40. A non-transitory computer-readable medium storing one or more instructions for wireless communication, the one or more instructions comprising:
one or more instructions that, when executed by one or more processors of a first wireless node, cause the one or more processors to:
transmit, to a second wireless node, an indication of a plurality of configurations to be used by the second wireless node to monitor for one or more reference signals in a plurality of intervals of a reference signal period, wherein the reference signal period is a synchronization signal burst set period, wherein the plurality of intervals comprise a first interval within the synchronization signal burst set period and a second interval within the synchronization signal burst set period, wherein the first interval is shorter than a default periodicity for repetition of the reference signal period, and wherein a first length of the first interval is different from a second length of the second interval; and
transmit the one or more reference signals.

41. The non-transitory computer-readable medium of claim 40, wherein different configurations, of the plurality of configurations, use at least one of different receive beams, different frequency offset hypotheses, different polarizations, or different precoding matrix configurations.

42. The non-transitory computer-readable medium of claim 40, wherein the one or more instructions further cause the one or more processors to transmit, to the second wireless node, an indication of an order in which the plurality of configurations are to be used across different reference signal periods having the default periodicity.

43. The non-transitory computer-readable medium of claim 40, wherein the one or more reference signals are one or more synchronization signal blocks.

* * * * *